United States Patent [19]

Jones

[11] 4,114,917
[45] Sep. 19, 1978

[54] TANK TRAILER
[76] Inventor: Thomas C. Jones, 3603 Westlawn, Amarillo, Tex. 79102
[21] Appl. No.: 869,717
[22] Filed: Jan. 16, 1978
[51] Int. Cl.² .............................................. B62D 1/02
[52] U.S. Cl. .................................... 280/116; 280/125
[58] Field of Search ............... 280/116, 132, 125, 140, 280/113, 114, 141, 513, 115, 126

[56] References Cited
U.S. PATENT DOCUMENTS 3,718,343  2/1973  Mills ...................................... 280/116
3,810,652  5/1974  Quirk ..................................... 280/125

*Primary Examiner*—Philip Goodman
*Attorney, Agent, or Firm*—Ely Silverman

[57] ABSTRACT

In a tank trailer having a longitudinally extending frame member, a rear wheel assembly extending transverse to the longitudinal member and a front wheel assembly, rotatable and sealed connections and structures are provided between the longitudinal member and the front wheel assembly whereby tight turns are reliably made on rough land, such as furrowed fields.

7 Claims, 13 Drawing Figures

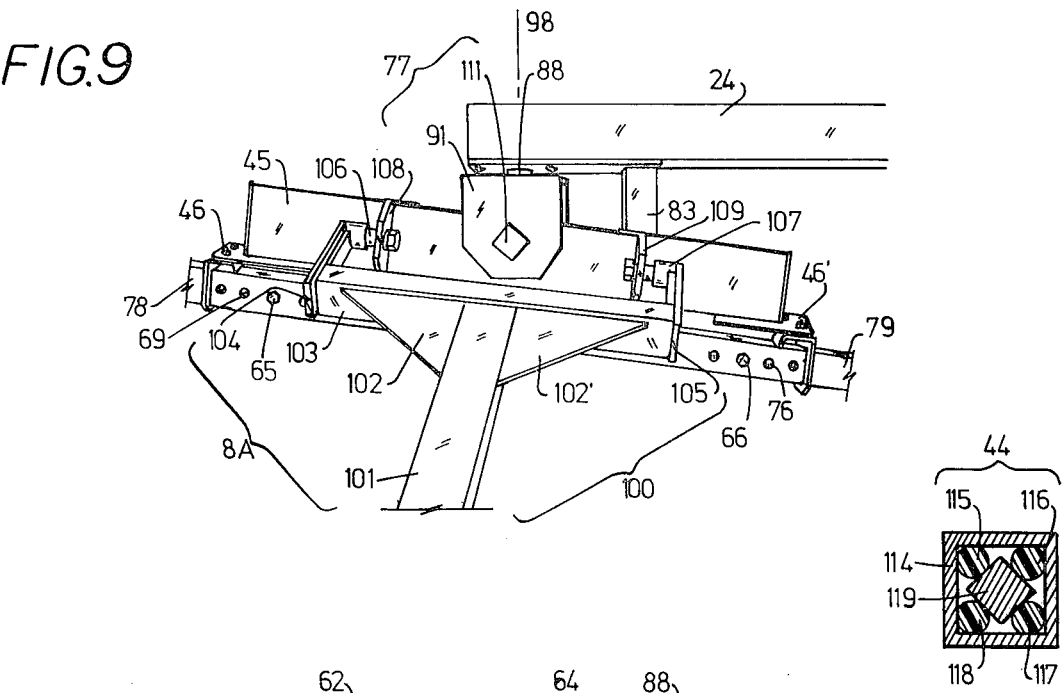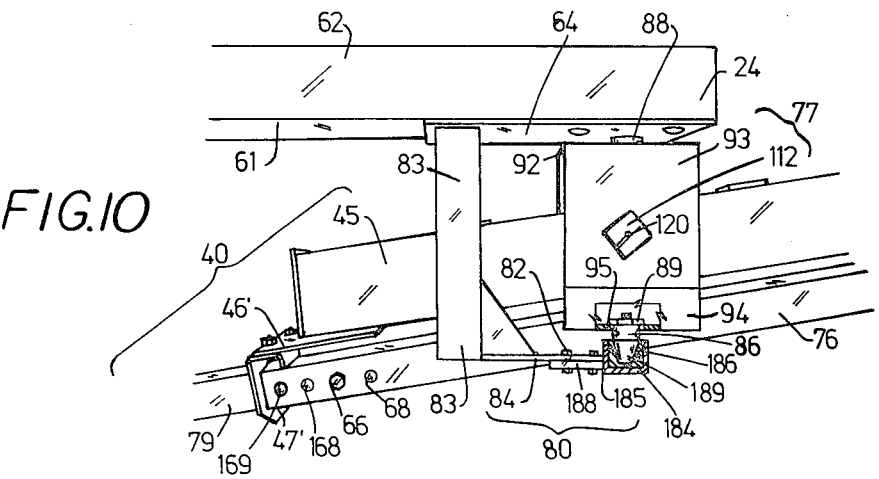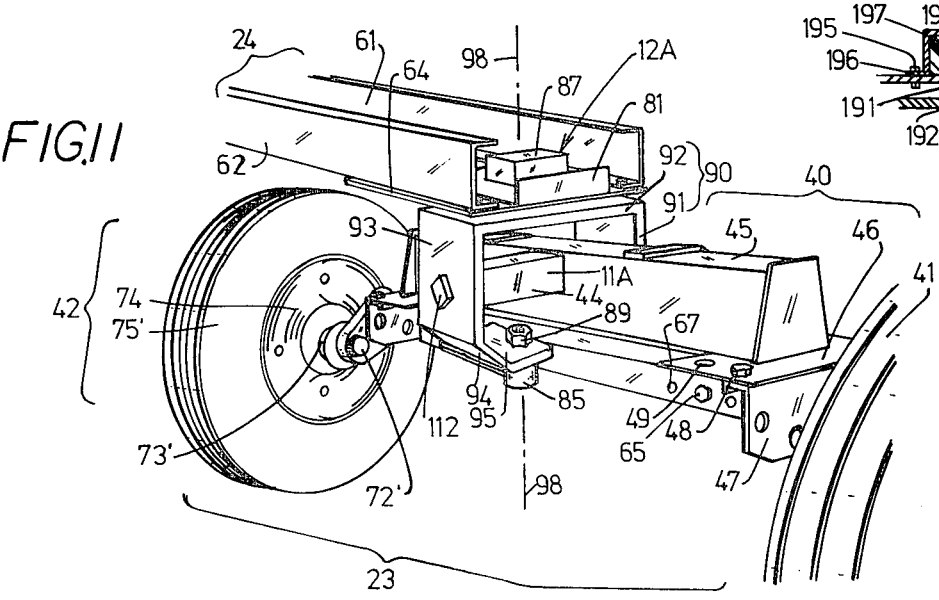

2

TANK TRAILER

BACKGROUND OF THE INVENTION

The field of the invention is wheeled land vehicles.

PRIOR ART

Tank trailers as in U.S. Pat. No. 3,810,652 provide for pivoting a front wheel assembly of a wheeled frame about a longitudinally extending generally horizontal axis parallel to the length of that wheeled frame and, also, about a second, substantially vertically extending, axis perpendicular to the length of that wheeled frame. The concurrent pivoting of the wheel assembly about both of these axes however is limited because the apparatus in U.S. Pat. No. 3,810,652 is not able to allow for any substantial tilting of the axis of rotation of those front wheels about a horizontal axis when the axis of rotation of the wheels of the front wheel assembly of such apparatus is rotated about the second, vertical, axis to a plane at or close to an angle of zero degrees to the longitudinal axis of the wheeled frame. Such relationship is usually met during tight turning operation on rough terrain and such operation causes mechanical failure of that type of apparatus or limits the tightness of turn on rough land and limits the roughness of land on which such apparatus can be used.

Apparatuses as in U.S. Pat. No. 3,718,343 and 2,967,057 provide for tilting of the front wheels of a wheeled trailer about a longitudinal axis parallel to the frame length and perpendicular to the axis of rotation of such wheels while also providing for rotating such wheeled assembly about a vertical axis perpendicular to the axis of rotation of such wheels. However, the apparatus of such patents depends upon the movement of bearing surfaces that are exposed to dust and dirt in the usual field atmosphere. Accumulation of dirt on those bearing surfaces results in rough or sticky action as well as locking of the intended bearing surfaces. The apparatus of this invention overcomes such disadvantages of the prior art apparatuses.

SUMMARY OF THE INVENTION

In a tank trailer having a longitudinally extending frame member and a rear wheel assembly with wheels supported on an axle transverse to the longitudinal member, the front wheel assembly is connected to longitudinal members by a series of structures and connections which are rotatable so that the front wheels may travel in a direction at 90 degrees to the length of the longitudinal member while, at the same time, such front wheels may pivot about a horizontal axis which extends transversely to the longitudinal axis of the longitudinal member. To accomplish this a first pivot assembly is provided with its bearing surfaces located so as to protect them from dirt and to provide for smooth rotation of the axis of rotation of the wheels of the front wheel assembly about a first, vertical, axis. This first pivotal structure also avoids binding or locking of the pivot members by incorporating a vertically movable frusto-conical joint. A second pivot support assembly provides for the rotation of the front wheel about a second, horizontal, axis transverse to the first vertical axis by a pivotal elastic joint utilizing elastic compression members and, thereby, insensitive to usual atmospheric dirt and grit.

A resilient crank arm axle support locates the ground contact zone of the wheels to the rear of the axle supported by such wheels yet allows a 90° turn of front wheel and, on stress, provides relief to bearing surfaces of the first pivot assembly.

BRIEF DESCRIPTION OF THE DRAWINGS

FIG. 4 is also provided as a base for showing the relations and views by which

FIG. 5 is a view of apparatus 20 with tank 30 broken away and as viewed along the direction of arrow 5A of FIG. 4 in the vertical series of planes extending from point 56 to point 57 and thence, successively, to points 54, 53, 58, 50 and 60 on FIG. 4. FIG. 5 thus shows the position of parts of the apparatus 20 relative to different portions of furrowed land during turning of the apparatus 20.

Figure 5:
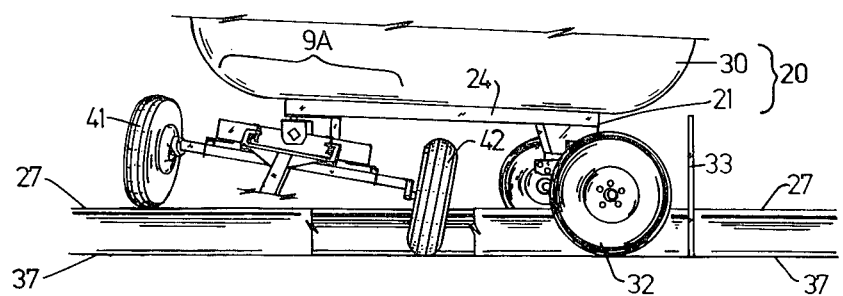
FIGS. 5, 6, and 7 are taken.

In view of the angular relation of section line 56–53 to ridge 27 that ridge doesn't appear in FIG. 5; also, in view of angular relation of line 56–58 to ridge 28 that ridge appears twice in FIG. 5.

Figure 4:
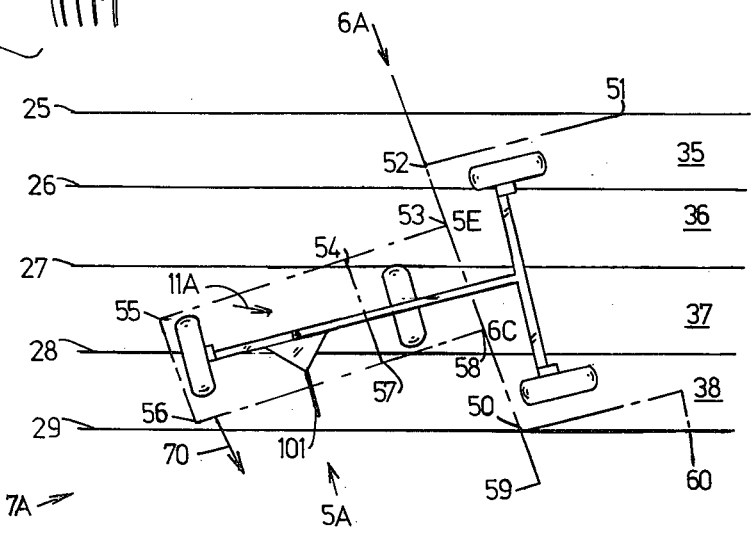
FIG. 4 is a diagrammatic top or plan view of a position of the wheels and the frame of apparatus 20 while the apparatus 20 is crossing a group of furrows in an area of furrowed land.
Figure 6:
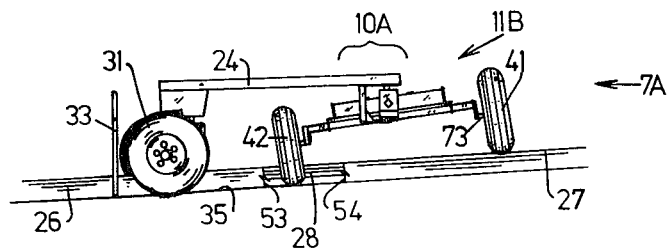

FIG. 6 shows the frame of apparatus 20 as viewed in the direction of arrow 6A in FIG. 4 and along the series of adjacent vertical planes extending from point 51 to point 52 and thence to 53 and 55 in FIG. 4 with ridge 27 cut away in zone 53–58–57–54 of FIG. 4.

Figure 7:
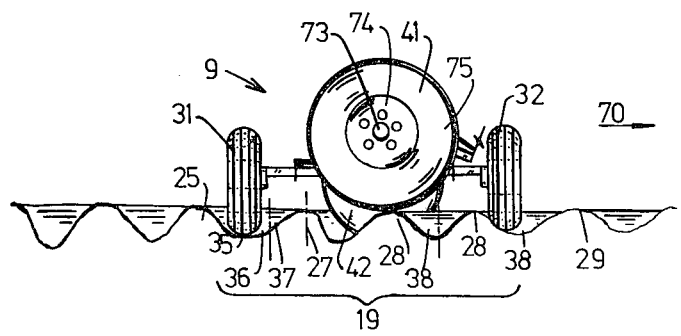

FIG. 7 is an end view, partly in section, taken along the direction of arrow 7A of FIG. 4. This view shows the location of the relative heights of the wheels and is taken along the series of vertical sections provided by adjacent series of vertical planes extending from point 52 to point 53 and thence successively to points 56, 58 and 59 on FIG. 4.

Figure 8:
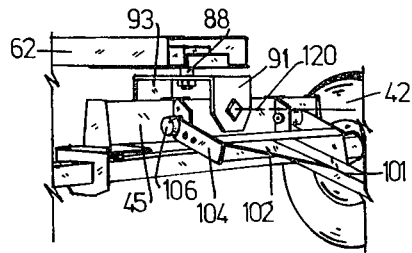

FIG. 8 is a front oblique view of the parts of the front wheel assembly 23 to show details of the longitudinal transverse and vertical relations of parts of apparatus as shown in zone 8A of FIG. 9.

FIG. 9 is an enlarged view of zone 9A of FIG. 5.

FIG. 10 is an enlarged view of zone 10A of FIG. 6 and is broken away in part as a sectional view as a vertical longitudinal section to show details of lower journal assembly 85.

FIG. 11 is an oblique pictorial view along direction of arrow 11A of FIG. 4 and that same view is shown by direction of arrow 11B in FIG. 6.

FIG. 11A is an enlarged diagrammatic transverse vertical cross-sectional view of zone 11A of FIG. 11.

FIG. 12 is a diagrammatic vertical cross-sectional view through the line of axis 98 in zone 12A of FIG. 11.

FIGS. 1, 3, 5, 6, 7, 8, 9, 10 and 11 are drawn to scale to show quantitative relations between the parts shown.

A 36 inch long yardstick 33 is shown in each of FIGS. 5 and 6 so that some dimensions of the larger components of apparatus 20 may be approximated therefrom.

TABLE I provides dimensional data of apparatus 20 for smaller components thereof.

NYLATRON is a name applied to an industrial grade of high density nylon made by DuPont Company. When such material is used in bearings as 197 and 189 disclosed herein a similar high density nylon or like high strength plastic material may be used. Nylon is a generic term for long chain synthetic polymeric amides.

DESCRIPTION OF THE PREFERRED EMBODIMENT

The apparatus 20 comprises a wheeled frame 21 and a tank 30 supported thereon and firmly attached thereto.

The frame comprises a rear wheel assembly 22, a front wheel assembly 23 and a longitudinal member 24. The front wheel assembly 23 is pivotally attached to the front end of the member 24; the rear wheel assembly is firmly fixed to the rear end of member 24.

Generally, the apparatus 20 of this invention is one for carrying a liquid containing tank across rough surfaced fields such as plowed fields while being able to maneuver that tank reliably and safely on such field, and known as a tank trailer.

Figure 1:
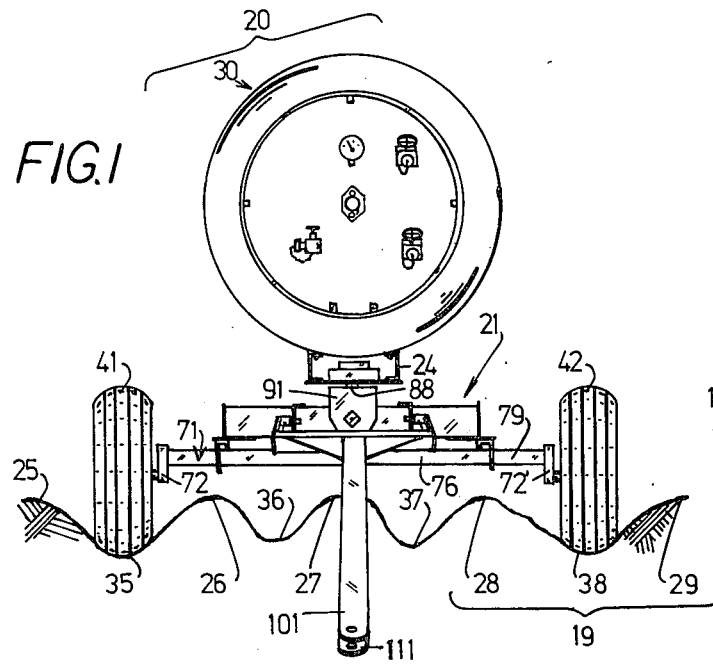
FIG. 1 is a vertical front and sectional view of an apparatus 20 according to this invention. This view is taken along the direction of the arrows 1A and 1B of FIG. 2 along section 1A–1B of FIG. 2 with the wheels of the front assembly directed parallel to the length of the central longitudinal member 24 of apparatus 20.
Figure 2:
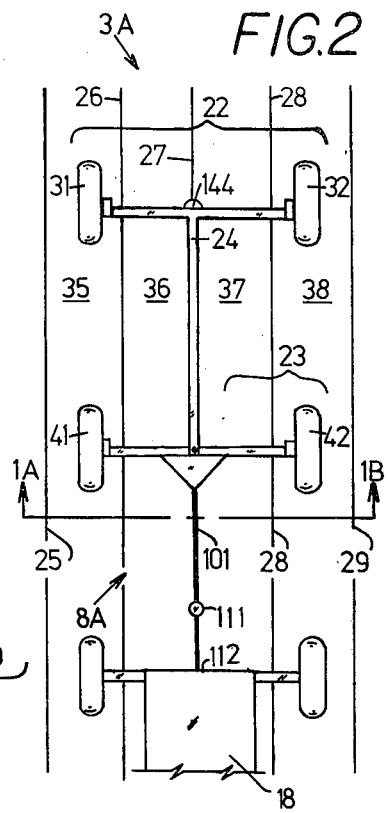
FIG. 2 is a diagrammatic top or plan view of the frame of the apparatus according to this invention with the wheels of the front assembly and wheels of the rear assembly parallel to each other on furrowed land and drawn by a tractor 18.
Figure 3:
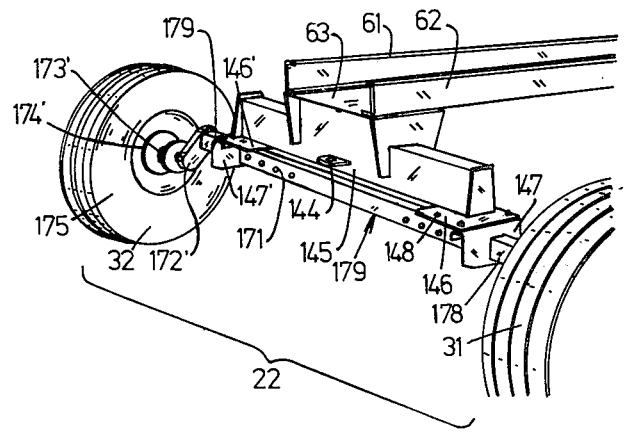
FIG. 3 is an oblique view of the rear wheel assembly 22 as seen along the direction of arrow 3A of FIG. 2.

The land 19 on which the apparatus 20 is directed to operate usually has furrows therein. 24-inch wide parallel furrows are exemplary and are used in the particular drawings, which are to scale. The width of apparatus 20 is adjustable so as to be adapted to be drawn along furrows of different size such as 36 inch, 30 inch and others as are conventional but the relations to furrows shown for 24-inch wide furrows are applicable to furrows of other sizes so that the relation to furrow size herein shown are merely exemplary of the relations of furrows of varied width along and across which this apparatus is drawn. There are shown here, as exemplary, tops or ridges of the furrows 24, 26, 27, 28 and 29. The tops or ridges of the furrows, as 25 and 26, are separated by furrow bottoms or troughs such as 35–38 with each of such troughs 35–38 lying between adjacent furrow tops or ridges as shown in FIGS. 1, 2 and 4. For example, furrow top or ridge 25 and 26 are located on either side of the trough or bottom 35 of furrow 35. Similarly each furrow trough as 35 and 36 is located on either side of a furrow top or ridge as furrow top 26.

The apparatus of this invention provides not only that the trailer as 20 may be drawn along a path parallel to the length of the furrows or troughs of each of the furrows as 35–38 in FIG. 2, but, also, that the tank trailer may also be very readily moved at right angles to the length of the trailer; i.e., perpendicular to the length of the member 24 in a direction as 70 as shown in FIGS. 4 and 7.

The front wheel assembly comprises a cross-bar and wheel assembly, a pivot assembly 77, and a draw-bar assembly 100.

The cross-bar and wheel assembly, 40, comprises, as shown in FIGS. 8–11, a rigid transverse cross-bar 45, rigid right end plate 46 and rigid left end plate 46', vertical right and left web plates 47 and 47', nuts as 48 and holes therefore as 49, a rigid pivot sleeve 44, a front axle assembly 71 and front wheels 41 and 42. The plates 46 and 46' are rigid and firmly attached to and located at the lateral (as shown in FIGS. 1 and 11) ends of the bar 45 and are attached releasably yet firmly by bolts as 48 to the vertical plates 47 and 47'. Axle assembly 71 is a rigid adjustable beam composed of a front central axle sleeve 76 which is firmly attached to web plates 47 and 47' and right and left front extensible sleeve arm portions 78 and 79. The arm portions 78 and 79 are rigid hollow square sectioned steel tubing that fit slidably or telescopically and smoothly, without rotation relative to and within the rigid hollow square sectioned strong steel tubing of which central axle sleeve 76 is formed. Sets of bolts and nuts 65 and 66 fit into holes therefor as 69 (laterally thereof) or 67 (centrally thereof) in the axle sleeve 76. Similar holes as 168 (lateral to 66) and 169 (lateral to 168) and 68 (central to 66) are provided on left side of sleeve 76. Such holes are spaced at 3 inch center to center distances. The bolts as 65 and 66 are rigid and located into correspondingly spaced holes in the axle sleeve and arms, as shown in FIGS. 9–11 to firmly position the axle arms in the sleeve 76 for desired side to side or lateral spacing of the wheels, as 41 and 42 on the axle assembly 71. The particular spacing shown for wheels 41, 42, 31 and 32 is a 6 foot spacing, but such spacing may be adjusted by six inch increments up to 8 feet. Each axle arm, as 79 is firmly attached at its right end (see FIG. 1) to a rigid crank arm 72 which arm is resiliently supported, as by a torsion bar located in arm 79. An elastic joint as in U.S. Pat. No. 3,436,069 may also be used to provide for a limited elastic movement between arm as 72 while providing for a firm support by the wheel as 41 to the axle 71 therefor. Similar structures as 72 are provided for all of wheels 31, 32, 41 and 42.

The crank arm 72 supports an axle 73 and axle 73 rotatably supports a wheel frame as 74 and tire 75. The wheel frame 74 and tire 75 comprise a right front wheel 41. A like crank arm support 72' and axle 73' and wheel frame 74' and tire 75' are provided on the left side of the axle 71.

The bar 45 is located forward of axis 98 during forward motion of the trailer 20 as shown in FIG. 2; accordingly, the areas of contact of the bottom of wheels 41 and 42 with the ground therebelow then lie substantially in a vertical plane which extends directly downward from the center of shaft 88 in the bearing or journal assembly 87 and through the axles of wheels 41 and 42. Further, the forward location of the shaft 45 relative to axis 98 allows the wheels 41 and 42 to be located with their axes of rotation parallel to the length of channels 61 and 62 as shown in FIGS. 4, 6 and 10 because the bar 45 can extend to one side (left) as shown in FIGS. 4, 5 and 6 of the post 83 or to the right thereof. Accordingly the apparatus 20 may make "tight" turns on rough ground.

The pivot assembly 77 comprises a pivot assembly support unit 80, and a pivotal unit 90. The cross-bar wheel and axle assembly is supported on the pivotal unit 90 and pivotal unit 90 is rotatably supported on the support unit 80. The unit 80 is firmly attached to front end of member 24.

The longitudinal frame member 24 comprises a rigid longitudinally extending right side channel 62 and a like rigid channel 61. Both 61 and 62 are C-shaped as shown in FIGS. 2 and 11 and joined to a front web plate 64 at the front end of member 24 and a like rear web portion 63 at the rear end of member 24. Each web plate or portion is a rigid steel plate firmly joined to the members 61 and 62 and serves to maintain the orientation of the channels 61 and 62 relative to each other.

The pivot support unit 80 comprises a rigid top reinforcing plate 81 and a rigid vertical post 83 and a horizontally extending rigid tongue 84. Post 83 is firmly attached at its top to the bottom of plate 64. At its bottom post 83 is firmly attached to the rear end of arm 84. Arm or tongue 84 extends forward and is firmly attached to a journal plate 188 by assembly bolts as 82: plate 188 supports journal 85.

A short rigid vertical shaft 86 is firmly fixed at its top to the bottom plate 95 and it has a frustoconical lower end 189 that is rotatably supported in journal 85 at its bottom. An upper rigid cylindrical shaft 88 is rotatably supported in an upper journal 87 which is firmly attached to the plate 64. The bottom of shaft 88 is firmly attached to the top of plate 92. Shafts 88 and 86 rotatably support the pivotal unit 90. Details of structure of shaft 88 are shown in FIGS. 8 and 12.

The pivotal unit 90 comprises a front plate 91, a top horizontal plate 92, a rear vertical plate 93 and a bottom horizontal plate 95. The bottom horizontal plate 95 and the rear vertical plate 93 are joined by a rear diagonal bottom plate 94 as shown in FIG. 11. The plate 91 is a rigid flat vertical plate as shown in FIGS. 9 and 11; it is joined at its top to a rigid flat plate 92; plate 92 is joined at its rear end (left side as shown in FIG. 11) to top of plate 93 which is rigid and flat as is each of plates 94 and 95. These rigid plates are firmly joined as a C-shaped structure. The rigid cylindrical shaft 86 is firmly fixed to plate 95 and rotatably fits in journal 85 and provides a lower pivotal support for unit 90. The short rigid cylindrical shaft 88 is firmly located on plate 92 and is rotatably located in support 87 to provide an upper pivotal support for plates 92 and 95. The shaft 86 is held by a nut 89 (shown in FIG. 11) and is co-axial with shaft 88. The axis of shafts 88 and 86 is located half way between plate 61 and 62 in the socket 87 therefor as shown in FIG. 11 and is perpendicular to the length of side plates 61 and 62. The plate 64 is reinforced by angles as 81 and supports the journal 87.

Tube 44 is a resilient device with deformable cushions as in U.S. Pat. Nos. 2,729,442 or 2,712,742: such resilient device is used for a pivotal support and comprises an outer tubular member, an inner member substantially coaxially disposed within the outer member with sufficient clearance for relative rotation of one member with respect to the other about their common axis, and a plurarlity of elastic cushioning rollers 116, 117, 118, 115 disposed between the interior of the outer member 114 in substantially uniformly spaced relationship about the inner member 119, said cushioning rollers being free of connection with said members for rolling engagement therewith, the inner profile of said outer member in a transverse plane being substantially a square and providing four substantially flat, roller-engaging surfaces having axially extending junctions, the outer profile of said inner member in a transverse plane having four roller-engaging sides normally disposed opposite and facing generally toward said junctions, respectively, there being four of said cushioning rollers and one being normally disposed against each of said junctions and confined between two of said roller-engaging surfaces of said outer member and one of said roller-engaging sides of said inner member.

Solid square sectioned shaft 119 is firmly attached to plate 91 at one head or end 111 and is firmly attached to plate 93 at its opposite end head 112. The resilient and compressible members 115–118 have equal length and the same cross-sectional shape and resilience and extend parallel to shaft inner member 119 and outer sleeve 114 and allow rotation of the shaft or inner member 119 relative to the outer member or sleeve 114 smoothly about an axis of rotation 120 therebetween. That axis is perpendicular to and intersects axis of rotation 98.

The sleeve 114 and shaft 119 are provided with sealing end plates which are peripheral to the ends of the resilient members 115–118. These end plates are not weight bearing members, while members 115–118 and 198 and 197 are weight bearing movable members.

The structure of pivot assembly 77 provides that dirt has substantially no acess to the bearing surfaces of its moving weight bearing members, such as surface between 197 and 198 and weight bearing surfaces of members of tube 144. Also, the spatial relations between the contacting parts of the surfaces of such weight bearing surface does not change during operation (i.e. there is continual contact between such parts during operation) so that such pivotal supporting structure does not allow dirt thereinto, hence does not stick or bind or lock in dirty or dusty atmospheres as met during plowing and like field conditions.

The journal 87 comprises a cap 187 and a liner 107.

The shaft 88 has shoulder 191 which rests on plate 92: the shaft 88 passes through a hole 192 in plate 92 and a hole in plate 64 and is firmly held to plate 192 by nut 190.

The hemispherical head 198 of shaft 88 smoothly fits into a downwardly open hemispherical cavity in a strong smooth surfaced plastic bearing 197 such as NYLATRON ® therefor: that bearing 197 is held in a strong steel rectangular cap 187. That cap 187 has a strong horizontal top and vertical sides and horizontal lips or flanges as 196, all firmly joined together and firmly holding that bearing or liner 197. The journal or cap 87 is firmly held to plate 64 as by bolts 194 and 195 on lips as 196 of the journal cap 187.

The head 198 bears in the cavity in the liner 197; the liner is supported in the case and, through action of bolts as 194 and 195, by the plate 164. This bearing thus provides a smooth dirt-free rotatable support for the member 24. The shoulder 191 on shaft 88 and the shaft 88 spaces the bottom of plate 64 from the top of plate 92, as shown in FIGS. 8, 9 and 12.

Unit 77 is supported pivotally by bearing tube 44; bearing tube 44 is supported on cross-bar 44 and cross-bar 44 is supported through member 46, 46', 47, 47', axle 71, arms 72 and 72' and axles 73 and 73' of wheels 41 and 42 on the ground 19.

Journal 85 comprises an outer sleeve 185, an arm 188 and a liner 186 and a bottom wall 184. Journal 85 is generally cup-shaped: it comprises a rigid cylindrical side wall or sleeve 185 and a rigid bottom wall 184 joined firmly to that side wall. Journal arm 188 is a rigid bar that is firmly joined to the outside of the wall of sleeve 185.

The shaft 86 has a frustoconical bottom end 189 that is smoothly supported in a strong smooth-surfaced bearing liner or bushing 186 of matching interior frustoconical shape. That liner or bushing is firmly held in lower journal sleeve 185. Journal arm 188 is attached by nuts and bolt as 82 to arm 84 firmly.

The contact surfaces of the pivotal support elements 88 and 86 are held in locations that are mechanically protected from dirt and, also, are readily cleaned. Additionally, journal 85 does not bear weight but acts as a guide. Accordingly dirt does not cause binding in that journal. The bearing assembly tube 44 is constructed without exposed bearing surfaces so does not bind and moves freely even in dirty atmospheres.

The lower support journal 85 of the pivot unit support 80 may be provided with some vertical adjustment by shims between parts 84 and 188. In combination with the resilient action of arm 84 and the lack of direct mechanical connection from plate 91 to plate 95, any binding as or locking as might otherwise interfere with the smooth pivotal support action provided by supports 85 and 87 for the pivoting of assembly 77 and the axis of rotation of the front wheels 41 and 42 about axis 98 is avoided.

The weight bearing rotatable surfaces of journal assembly 87 are well sealed off and protected from dust and dirt. The weight bearing rotatable member 44 uses resilient coupling elements not affected by dusty atmosphere. Further, the third rotatable element, journal 85 is not weight bearing and is readily cleansed and adjusted.

The draw-bar assembly 100 comprises a tow-bar arm 101, fish plates 102 and 102', right and left side arms 104 and 105 and a cross-bar 103. Tow-bar handle arm 101 is rigid and firmly connected by rigid fish plates 102 and 102' to a tow-bar cross arm 103. That tow-bar cross arm is rigid and extends transversely to arm 101 and is connected at its ends to rigid tow-bar side arms 104 and 105. Arms 104 and 105 firmly support stub shafts 106 and 107 which are pivotally connected to rigid ear plates 108 and 109 which project forwardly of and are firmly connected at their rear to the bar 45. The stub shafts 106 and 107 provide a pivotal connection between the rigid tow-bar handle 101 and the rigid cross-bar 45. The stub shafts 106 and 107 are cylindrical and coaxial. The cross-bar 45 is firmly connected to rigid shaft 119; shaft 119 is held at its ends 111 and 112 to plates 91 and 93; shaft 93 is rotatable within tube 114 as above described; tube 114 is fixed to cross-bar 45. The arm 45 pivots smoothly about the connection of tube 114 to the plates 91 and 93 even in dusty atmospheres and in tight turns as shown in FIGS. 4–11. The stub shafts 86 and 88 provide a rotatable connection between the rigid longitudinal member 24 and the pivotal unit 90 of assembly 77. That rotatable connection has an axis of rotation 98 which axis passes vertically through the center of the horizontal plate 93 at a point halfway between members 61 and 62 of member 24. Accordingly, the rotation of the wheels 41 and 42 about the axis 98 does not cause any side to side shifting of the weight of the contents of the tank 30 or the tank 30 relative to the frame 24, as the axis 98 extends vertically when the rear wheels 31 and 32 are supported on the same horizontal plane as shown in FIGS. 5, 6 and 7 although the front wheels 41 and 42 are located at different levels.

Arm 101 is joined by a forward end clevis 111 to a hitch as 112 on a tractor 18 to be drawn along a field as 19 as shown in FIGS. 2 and 4–7.

The rear wheel assembly 22 comprises a rigid transverse cross-bar 145, horizontal end plates 146 and 146', vertical end plates 147 and 147', nuts as 148 and holes therefor as 149. The left and right plates 146' and 146 are rigid and located at and firmly attached to the left and right ends of the bar 145 and are releasably yet firmly attached as by bolts as 148 to the plates as 147. Rear Axle assembly 171 is formed of (a) a rear central sleeve 176, like front central sleeve 76 and (b) rear left and right telescopically extensible arms 178 and 179 like front arms 78 and 79. Rear assembly 171 is provided with holes and locking bolts as above described for the front axle assembly 71 and is correspondingly adjustable as to length. The rear left extensible arm 179 supports on its left side spring loaded crank arm 172' on which a left axle shaft 173' is supported. A wheel frame 174' is attached to the axle shaft 173' and provides for support for the tire 175'. The wheel frame 174' and tire 175' comprise the wheel 32. Similar axle shaft, wheel frame and tire are provided on the right side of the rear wheel assembly 22 on a rear right extensible arm 178 like front right extensible axle arm 78.

A hitch 144 is provided on the rear of rear cross-bar 145 to provide for attachment of other apparatus to frame 21 of trailer 20 to draw such other apparatus, as sprayers, behind the trailer 20.

As the speed of apparatus 20 increases during travel of apparatus 20 as shown in FIG. 2, the proportion of load on the bearing surface between head 198 and bearing surface therefor in liner 197 decreases while arm 83 takes on added load. This, accordingly, avoids binding due to high bearing stresses at surface of contact between liner 197 and head 198. The pressure between surfaces at liner 189 and shaft surface 186 is low and has a large margin of possible increase before any sufficiently high stress is reached to create any noticeable sticking, locking, or inhibit free turning of assembly 77 about axis 98.

TABLE I follows (as insert A).

| | |
|---|---|
| ASSEMBLY 80 | |
| Post 83-height | 14" |
| transverse cross section | 2¼" × 2¼" |
| axis 98 to rear of 83 | 12" |
| ASSEMBLY % RELATIONS | |
| Bottom of plate 64 to top of plate 92 | 1" |
| Bottom of plate 64 to top of journal 85 | 12¼" |
| PIN 86 | |
| Frustro-Control Portion 189 | |
| Maximum diameter | 1½" |
| Minimum diameter | 1" |
| Length of tapered portion | 1½" |
| Length of cylindrical portion | ½" |
| Shaft 86 - diameter | 1" |
| length (total) | 2½" |
| length (threaded portion) | 1¾" |
| Insert 189 - depth | 2" |
| - outside diameter | 2" |
| BUSHING 197 | |
| Material | Nylatron |
| Length | 5" |
| Width | 4" |
| Height | 2¼" |
| CAP 187 FOR BUSHING 197 | |
| Material | steel |
| Thickness | ¼" |
| Bolts, 194, diameter | ⅜" |
| BOLT 88 | |
| Shaft diameter | 1½" |
| Shoulder 191, diameter | 2¼" |
| length, total | 5¼" |
| head, 198, diameter | 1½" |
| PIVOTAL ASSEMBLY 90 | |
| Assembly 44 | |
| Tube 114, length, total | 14" |
| size | 3" × 3" |
| rear end of tuble 114 to rear end of bar 45 | 9" |
| front end of bar 45 to front end of tube 114 | 1" |
| Shaft 119, length | 16" |
| size | 1¾" × 1¾" |
| Bar 45, thickness | 4" × 6" |
| length | 44" |
| Plate 91 - width, maximum | 5" |
| height | 6" |
| Plate 92 - front to rear (o.d.) | 16" |
| thickness | ¼" |
| width (maximum) | 8" |
| Plate 93 - height | 7" |

-continued

| | |
|---|---|
| width | 5" |
| Plate 94 - angle to horizontal | 45° |
| length | 7" |

I claim:
1. In a tank trailer having
   A. a longitudinally extending frame member and
   B. a rear wheel assembly with rear wheels supported on an axle extending transversely to the longitudinal member and a front wheel assembly rotatably connected to said longitudinal member the improvement which comprises that:
   C. said front wheel assembly comprises a first pivotal support assembly, a second pivotal support assembly and a wheel and frame assembly,
     (1) said first pivotal support assembly comprising a first pair of pivotal connectors and a first pivotal support frame,
        (a) said first pair of pivotal connectors comprising a first, upper, pivotal connector and a second, lower, pivotal connector,
          (i) said first, upper pivotal connector comprising a first stationary bearing surface support and a first movable bearing surface support adjacent to each other and rotatable about a first, vertical axis of rotation for said connectors,
          (ii) said second, lower, pivotal connector comprising a second stationary bearing surface support and a second movable bearing support adjacent to each other and rotatable about an axis of rotation co-axial with said first axis of rotation, said second, lower, pivotal connector being located below, and spaced away from, said first, upper, pivotal connector, and
        (b) said first pivotal support frame comprising a first rigid post attached to and extending downward from said longitudinal member and a second member attached firmly to said post and extending forward from said post to said second stationary bearing surface support,
     (2) said second pivotal support assembly comprising a second pivotal support means and a second pivot support frame;
        (a)
          (i) said second pivotal support frame having a first, upper, and second, lower, rigid part, each extending in a direction transverse to said first axis of rotation and vertically spaced from each other,
          (ii) and a third part extending in a direction parallel to said first axis of rotation and comprising a rigid bar connected to one end of each of said first and second parts,
          (iii) and a fourth rigid part extending in a direction parallel to said first axis of rotation and connected to an end of said first part spaced away from said one end of said first part
          (iv) said first, upper, part being connected to said upper pivotal connector and
          (v) said second, lower, part connected to said lower pivotal connector,
        (b) said second pivotal support means comprising
          (i) an outer rigid tube and an inner rigid shaft within said tube and resilient members therebetween and extending parallel thereto, said shaft connected to said first and fourth parts of said second pivotal support frame,
          (ii) said tube being pivotally movable relative to said shaft along a second axis of rotation, said second axis being transverse to said first axis of rotation,
     (3) said wheel and frame assembly comprising a pair of wheels, said wheels rotatably mounted on axles, said axles attached to a rigid cross-bar, said cross-bar extending parallel to said axles of said wheels, said cross-bar firmly attached to said longitudinally extending frame member.

2. Apparatus as in claim 1 wherein a rigid axle support arm extends between and connects each of said axles and said cross-bar, said axle support arm extending horizontally transversely to said axle and rearwardly thereof, and a resilient connection between each said rigid axle support means and said cross-bar.

3. Apparatus as in claim 2 wherein said first stationary bearing surface comprises a downwardly facing surface of revolution axially symmetrical about said first axis of rotation, and said first movable bearing surface forms a smooth sliding fit therewith and said first pivotal connector comprises a rigid shaft that extends from said first movable bearing surface to a compression member that is firmly attached to and extends upwardly from said first upper part of said second pivotal support assembly, and all parts of said upper part of said second pivotal support assembly and said longitudinal frame member are vertically spaced apart from each other, and said second movable bearing surface of said lower pivotal connector comprises a downwardly tapering surface and said second stationary bearing surface of said lower pivotal connector comprises a downwardly tapering bearing surface and said second bearing support of said second, lower, pivotal connector is vertically movable relative to said first, upper, pivotal connector.

4. Apparatus as in claim 3 wherein said first axis of rotation is spaced away from said third part of said second pivotal assembly by a first horizontal distance and said cross-bar is spaced away from said third part by a second horizontal distance and said second distance is greater than said first distance.

5. Apparatus as in claim 4 wherein the difference in said first distance and said second distance is at least as great as one half of the horizontally measured transverse thickness of said post of said rigid support frame.

6. Apparatus as in claim 1 wherein said pivotal support means are free of weight-bearing, moving contacting surfaces exposed upwardly to the atmosphere.

7. Apparatus as in claim 6 wherein said axles on said wheel and frame assembly are laterally extensible.

* * * * *